(12) United States Patent
Benner et al.

(10) Patent No.: US 8,811,378 B2
(45) Date of Patent: *Aug. 19, 2014

(54) DUAL NETWORK TYPES SOLUTION FOR COMPUTER INTERCONNECTS

(75) Inventors: Alan Benner, Poughkeepsie, NY (US); Ramakrishnan Rajamony, Austin, TX (US); Eugen Schenfeld, Monmouth Junction, NJ (US); Craig Brian Stunkel, Somers, NY (US); Peter A. Walker, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 191 days.

This patent is subject to a terminal disclaimer.

(21) Appl. No.: 13/444,762

(22) Filed: Apr. 11, 2012

(65) Prior Publication Data

US 2012/0195591 A1  Aug. 2, 2012

Related U.S. Application Data

(63) Continuation of application No. 11/493,951, filed on Jul. 27, 2006, now Pat. No. 8,194,638.

(51) Int. Cl.
*H04L 12/28* (2006.01)
*H04L 12/46* (2006.01)
*H04L 12/66* (2006.01)

(52) U.S. Cl.
CPC ............. *H04L 12/4641* (2013.01); *H04L 12/66* (2013.01); *H04L 12/28* (2013.01)
USPC ........................................................ 370/351

(58) Field of Classification Search
CPC ................................................... H04L 12/4641
USPC ............................................. 370/351; 398/45
See application file for complete search history.

(56) References Cited

U.S. PATENT DOCUMENTS 6,865,179 B1 * 3/2005 Cao ............................... 370/352
2004/0146299 A1 * 7/2004 Clapp ............................ 398/49
2006/0229090 A1 * 10/2006 LaDue ........................... 455/507

* cited by examiner

*Primary Examiner* — Wei Zhao
(74) *Attorney, Agent, or Firm* — Griffiths & Seaton PLLC

(57) ABSTRACT

A computing system includes: a plurality of tightly coupled processing nodes; a plurality of circuit switched networks using a circuit switching mode, interconnecting the processing nodes, and handling data transfers that meet one or more criteria; and a plurality of electronic packet switched networks, also interconnecting the processing nodes, handling data transfers that do meet the at least one criteria. The circuit switched networks and the electronic packet switched networks operate simultaneously.

20 Claims, 4 Drawing Sheets

Electronic Packet Switching Network 210 where:
  $P$ = cluster routing delay
  $\Delta$ = packet switch delay
  $L$ = fiber propagation delay

Optical Circuit Switch Network 280

DUAL NETWORK TYPES SOLUTION FOR COMPUTER INTERCONNECTS

CROSS-REFERENCE TO RELATED APPLICATIONS

This application is a continuation of, and claims priority from, U.S. application Ser. No. 11/493,951, filed on Jul. 27, 2006, which application is incorporated by reference as if fully set forth herein.

STATEMENT REGARDING FEDERALLY SPONSORED-RESEARCH OR DEVELOPMENT

The invention described herein was funded in part by a grant from DARPA (Defense Advanced Research Project Agency) Program, Contract No. NBCH30390004-PERCS. The United States Government may have certain rights under this invention.

INCORPORATION BY REFERENCE OF MATERIAL SUBMITTED ON A COMPACT DISC

Not Applicable.

FIELD OF THE INVENTION

The invention disclosed broadly relates to the fields of computer systems, switching networks and network communications, and more particularly relates to the field of dual network type interconnects combining circuit switching and electronic packet switching.

BACKGROUND OF THE INVENTION

High performance computing (HPC) systems are capable of delivering sustained performance approaching $10.\sup15$ floating point operations per second (petaflops) on real applications; they work with very large data sets and/or they consume large amounts of memory. The HPC systems used today employ multitudes of processors, such as the Blue Gene/L, designed by IBM in conjunction with Lawrence Livermore National Laboratory and ranked as the world's fastest supercomputer in October of 2005 with 131,072 processors. The Blue Gene/L [Adiga N. R. et. al. 2002. "An Overview of the BlueGene/L Supercomputer." In Proc. IEEE/ACM SCO2. Baltimore] can sustain 280.6 trillion calculations per second, called 280.6 teraflops. Systems need upwards of 100K processors to achieve petascale performance. These systems include an interconnect system that connects the system processors.

Large-scale HPC systems rely on interconnects and interconnects affect the cost and performance of these systems. The increasingly high cost of high-bandwidth electronic interconnects is due to the expensive optical transceivers needed between switches.

HPC systems use packet-switched networks to interconnect system processors. Inter-processor messages are broken into packets. These packets are then routed through network switches. As system size scales up, a scalable interconnect can consume a disproportionately high portion of the system cost when striving to increase bandwidth while reducing latency. The high cost of such systems has created a need for cheaper alternatives to fulfill the needs of large-scale applications.

The NEC Earth Simulator is an example of a circuit switching based network. The Earth Simulator (ES) [Habata, S, Umezawa, K., Yokokawa, M., and Kitawaki, S. 2004. "Hardware system of the Earth Simulator," Parallel Computing, 30(12), pp. 1287-1313] network uses a huge electronic crossbar, with 640.times.640 ports.

The ICN (Interconnection Cache Network) [Gupta, V. and Schenfeld, E. 1994. "Combining Message Switching with Circuit Switching in the Interconnection Cached Multiprocessor Network" in Proc. IEEE Int. Symposium on Parallel Architectures, Algorithms and Networks—Ispan Horiguchi, S. (ed.), pp. 143-150] is another example of a network that includes processing nodes grouped into small clusters. A drawback of the ICN is that the ratio of the number of circuits to the number of processors in a node is limited to one-to-one.

A drawback of the ES is that although an Electronic Circuit Switch (ECS) has fast circuit setup and release times, for some AMR. codes and other irregular communication patterns with switching degree needs larger than 8 circuits from each node, the ES may perform poorly.

Another prior approach is the Gemini system [see Chamberlain, R, Franklin, M., and Baw, C. S., "Gemini: An optical interconnection network for parallel processing," IEEE Transactions on Parallel and Distributed Processing, 13(10), pp. 1038-1055 (2002)] which includes a dual multistage network wherein each node has only one optical port and one electrical port into the dual network structure. The Gemini system has the drawback that while it is advantageous to use an optical circuit for long messages that need to be transferred to only one specific destination, HPC applications require more than one destination per node.

In the Clint system [Eberle, H. and Nilsm Gura N., "Separated High-bandwidth and Low-latency Communication in the Cluster Interconnect Clint." Proceedings of the IEEE/ACM Supercomputing Conference, Baltimore (2002)], as in the Gemini system, there is no sharing of already established circuits among different nodes. Each node sets up its own circuit and may have enough data to send through this circuit before it needs to tear it down and setup another circuit to another destination. Both the Gemini and Clint systems have the shortcoming that a node can communicate with other nodes in the system in a limited manner.

There have been attempts to use the Internet as the network between large processing sites. In such systems the computing is performed over large distances communicates through optical fibers, with potentially different TCP/IP protocols. Two examples of such attempts are the Cheetah [Veeraraghavan, M., Zhenga, X., Leeb, H., Gardnerc, M., and Fengc, M., "CHEETAH: circuit-switched high-speed end-to-end transport architecture," Proceedings of the SPIE, Volume 5285, pp. 214-225 (2003] and OptiPuter [Defanti, T., Brown, M., Leigh, J., Yu, 0, He, E, Mambretti, J., Lillethun, D., and Weinberger, J., "Optical switching middleware for the OptiPuter," IEICE Transact. Commun. E86-B, 8, pp. 2263-2272 (2003)] projects. However, these systems have the drawback that neither allows the running of fine-grained HPC applications.

Therefore there is a need for a computer switching network that overcomes the above shortcomings of the prior art.

SUMMARY OF THE INVENTION

Briefly, according to an embodiment of the invention, a computing system includes: a plurality of tightly coupled processing nodes; a plurality of circuit switched networks using a circuit switching mode, interconnecting the processing nodes, and handling data transfers that meet one or more criteria; and a plurality of electronic packet switched networks, also interconnecting the processing nodes, handling data transfers that do meet the at least one criteria. The circuit switched networks and the electronic packet switched networks operate simultaneously. The system additionally includes a plurality of clusters which include the processing nodes, and a plurality of intra-cluster communication links. The electronic packet switched networks are for handling collectives and short-lived data transfers among the processing nodes and include one-tenth (or some other small fraction) of the bandwidth of the circuit switched networks.

BRIEF DESCRIPTION OF THE DRAWINGS

To describe the foregoing and other exemplary purposes, aspects, and advantages, we use the following detailed description of an exemplary embodiment of the invention with reference to the drawings, in which.

DETAILED DESCRIPTION

Figure 1:
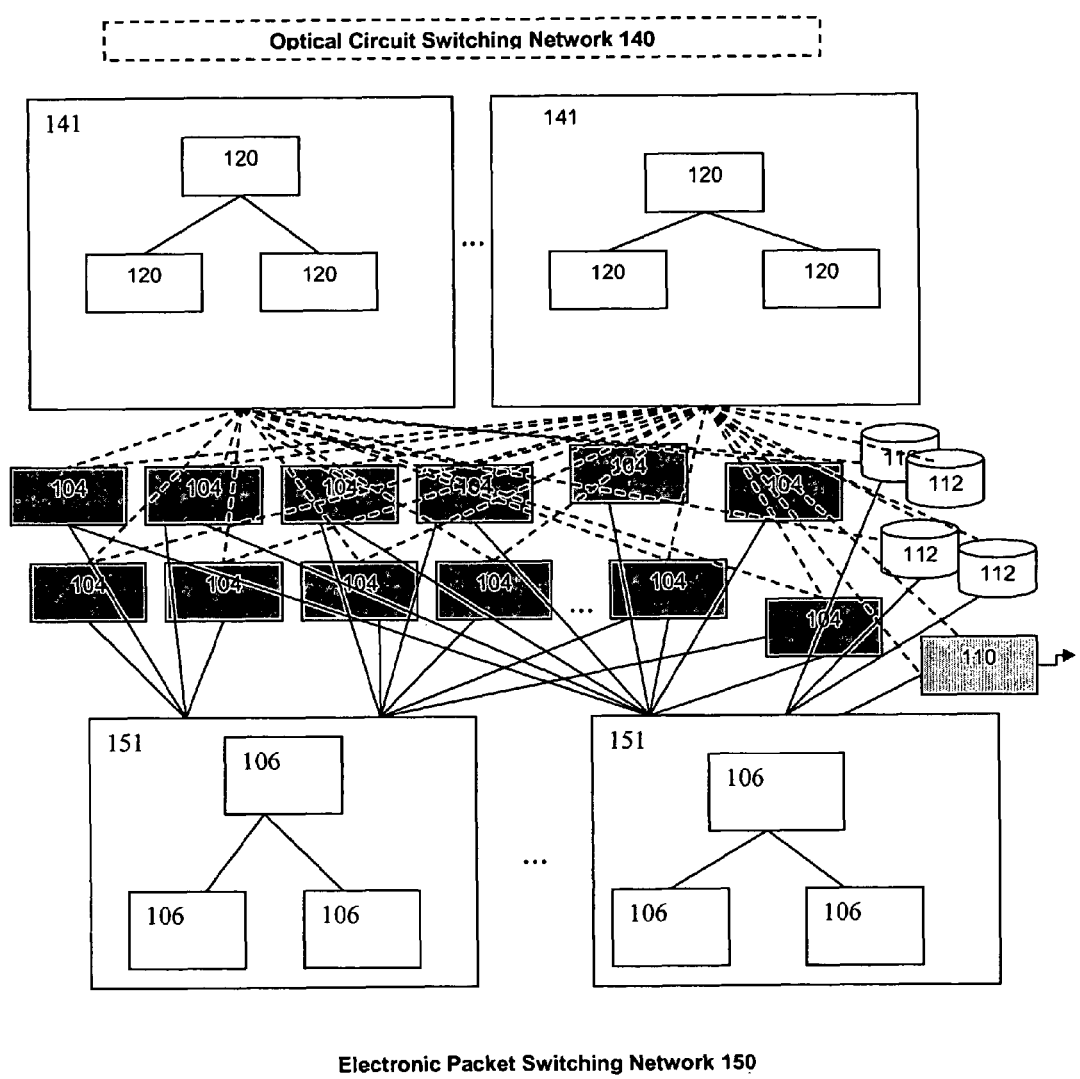
FIG. 1 is an illustration of an information processing system according to an embodiment of the present invention.

According to an embodiment of the invention, we describe two distinct and complementary types of communication networks operating simultaneously in a computing system: circuit switched (e.g., an Optical Circuit Switching (OCS)) networks for handling long-lived bulk data transfers, using optical switches; and secondary packet switched networks (e.g., Electronic Packet Switching (EPS)) for processing transient communication packets such as collectives and short-lived data transfers. Accomplishing data transfer with an optimum combination of high bandwidth and low latency is achieved with dual network types when each network type is dedicated to a communication class appropriate for its network technology. The communication classes are distributed based upon information about the data transfers (messages). One implementation of such a system is described in detail by Kevin J. Barker, Alan Benner, Ray Hoare, Adolfy Hoisie, Alex K. Jones, Darren J. Kerbyson, Dan Li, Rami Melhem, Ram Rajamony, Eugen Schenfeld, Shuyi Shao, Craig Stunkel, and Peter Walker in their paper entitled "On the Feasibility of Optical Circuit Switching for High Performance Computing Systems," Super Computing, SC/05, Nov. 12-18, 2005, incorporated fully by reference herein.

High Performance Computing Systems (HPCs) rely on interconnects which drive up the costs of these systems. Most interconnects today employ electronic packet switching elements with optical transceivers. The optical transceivers drive up the cost of the system. The dual network architecture according to an embodiment of the invention reduces the use of optical transceivers, thus providing high performance at a manageable cost.

OCS Network.

In an OCS network type optical switches directly manipulate the light beams, without any electronic processing. This eliminates the need for optical to electrical to optical (O-E-O) conversions, which are expensive. When all data paths are optical you use fewer optical transceivers. This can result in significant cost savings as compared to an all-electronic network, yet the bandwidth doesn't decrease. In one embodiment of the present invention, OCS network switches use optics at all elements of the data path with switching accomplished through the MEMS-based (Micro-Electro-Mechanical Systems) technology. The MEMS mirror arrays physically move a light beam to establish an optical data path between an input and an output port. Once this optical data path has been established, communication between the end-points occurs at a very high bandwidth and very low latency. In optical switching, distance between ports is nearly irrelevant; therefore two distant end-points can communicate at equal bandwidth and near-equal latency. Since the optical circuit switch does directly switch the light beams, it does not suffer from queuing and arbitration latencies common with electronic packet switches.

Circuit switching using large, slow telco all optical switches (such as MEMS-based ones), have the ability to handle high-bandwidth data transfers. The main drawback of these MEMS-based switches is the relatively long time (in the order of milliseconds) they need to reconfigure their connections. However, since the circuits established using the OCS network will be used for long-lived data transfers, the slower switching speed will not be a performance impediment in this case.

Electronic Packet Switching Network.

Collectives and transient communications are routed over a secondary lower-bandwidth EPS network type. With its much higher switching speed, the secondary interconnect is able to handle this kind of traffic with low latency. To make sure that this secondary interconnect is not overwhelmed with traffic we use it for only a portion of the traffic, preferably not more than ten percent (10%) of the overall traffic. Electronic packet switching, using fast, but small, radix electronic switches, can quickly switch among the already set optical circuit paths.

Referring to FIG. 1, there is shown a block diagram of a high performance computing system 100. The system 100 includes two complementary network types with multiple planes: an optical circuit switching network type 140 and an electronic packet switch network type 150. Note that the networks themselves may include other networks.

In this embodiment, the circuit switched network type 140 includes a plurality of optical switching planes 141. Each switching plane 141 includes a plurality of tightly coupled nodes 120. The electronic packet switching network type 150 includes a plurality of packet switching planes 151. Each packet switching plane 151 includes a plurality of tightly coupled nodes 106.

The system 100 includes a plurality of clusters of tightly-coupled processing nodes 104. The nodes 104 are each coupled to the optical circuit switching network type 140 and to the electronic packet switching network type 150. Each cluster includes multiple inter-cluster connections, and can be one of two types: point-to-point connections or packet-switched connections. In an alternative embodiment, SMP (Symmetric Multi-Processor) systems may be used in place of clusters. The composition of the two types of networks can vary in the number of nodes and switches of each type and in the number of individual planes used in a system.

Each processing node 104 is connected to an intra-cluster network 106 (switched or directly connected) which passes communication packets (messages or memory access types) between all processing nodes 104 of the cluster. Each processing node 104 includes multiple inter-cluster opto-electronic links (shown as solid lines), connected with protocol processing hubs, or NICs, such that each processing node 104 can share the links of any other processing node 104 in the same cluster. The processing nodes 104 also include processors, local memory and local cluster interconnects. The processing nodes 104 are connected to the electronic packet switch networks 150 via a plurality of electronic links (shown as solid lines). The packet switch networks 150 include packet switch nodes 106. An all-optical switch or multiple planes of such switches connect all the inter-opto electronic links of all the clusters of processing nodes 104.

Optical cross-connect circuit switches 120 are part of the optical circuit switching networks 140 and are shown connected to all of the processing nodes 104 via optical links shown as dashed lines. Storage nodes 112 are linked to both networks 140 and 150. A network input/output interface 110 is used for connecting to other networks. The other networks could be another Local Area Network (LAN) or a Wide Area Network (WAN).

The embodiment of system 100 considered here is for HPC applications that currently execute on large-scale clusters or SMP parallel-processing machines, such as those used at national laboratories. In these systems, thousands of processors, and their associated memory and disk storage subsystems, are tightly coupled together across a high-performance network. It should be understood that other embodiments for non-HPC systems, such as commercial systems, are also possible.

Supercomputing systems are typically interconnected using a multi-stage interconnection network (MIN) using either an indirect network topology, or a direct network topology. There are many topology variations possible, depending on full system size and switching elements used.

Dual-Network Types System.

It is important to note that the system 100 may include more than two networks. The key element of the system 100 is that however many networks populate it, at least one of the networks must be of the EPS network architecture and at least one of the networks must be of the OCS architecture. These two distinct network types interact in a complementary fashion to optimize the data transfer needs of HPC systems. Our system 100 includes two complementary network architectures as shown in FIG. 1. It has the following components:

Compute nodes, or processing nodes 104. These nodes contain multiple processors, their associated memory, storage, and network interface components. They may consist of SMP (Shared Memory Processor) nodes sharing a single operating system, or clusters of SMPs, or clusters of single-processor nodes. These compute nodes contain at least one NIC (Network Interface Card) or HCA (Host Channel Adapter). They also contain some local electronic switching capability to allow traffic from the compute nodes 104 to be distributed across at least one plane of an electronic packet switching network 150, and several planes of optical circuit switching networks. The compute nodes 104 also have optical transceivers to provide fiber interfaces to the network switches.

Optical Circuit Switching (OCS) network 140.

These networks 140 include multiple planes of all-optical switches. The compute nodes 104 are interconnected by circuits via a link in their NICs. These circuits can be shared among the data traffic going from any processing element in one compute node 104 to any processing element in another node. This network exhibits lower latency than the EPS network 150 once circuits are established. This is because electronic buffering and optical-to-electronic-to-optical conversions are not required in an OCS.

The sharing of many circuits among clusters of nodes in the OCS system 140 eliminates the need to keep resetting established circuits between processing nodes 104. Setting up and tearing down a circuit drives up the latency cost as compared to packet switching networks. With an OCS network 140, multiple circuits are shared among groups of processing nodes 104, and circuits do not need to be set up and torn down as often. Once a circuit is set up, it can be repeatedly used by any processing element member of a node cluster or SMP to communicate with any member of the remote node. This mechanism results in a lower latency of communication for packets or messages passing through a circuit.

In one embodiment, a compiler inserts instructions to set up the OCS at application startup, enabling the use of the OCS without any switching latency during application execution. In cases where the static analysis is not enough, a run-time policy is used to dynamically move traffic between the OCS and packet-switched networks.

Figure 2:
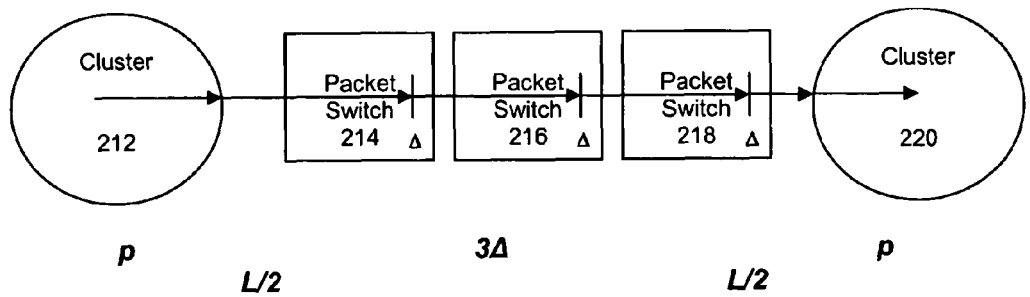
FIG. 2 is a comparison of latency cost in an electronic packet switch network vs. an optical circuit switch network.
Figure 2:
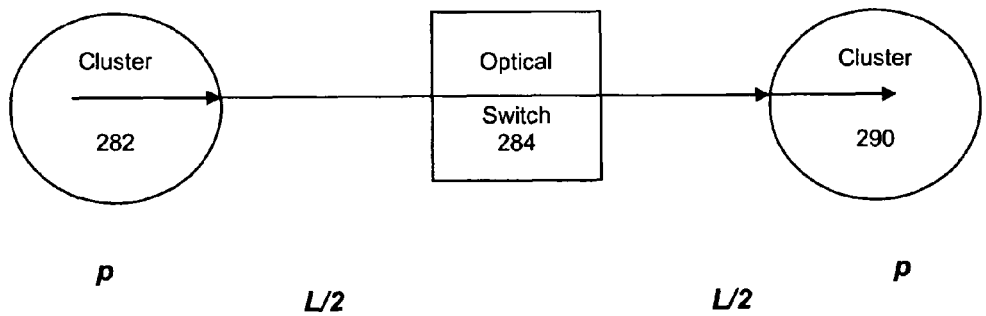

Referring to FIG. 2, we show a comparison of the latency through a multi-stage electronic packet switching network vs. an OCS network. The end-to-end delay through the electronic packet switching network may be described in terms of 3 components: the delay inside the source cluster 212 and destination cluster 220, the signal propagation delay through the fibers or electrical wires interconnecting the clusters and packet switches, and the delay through the one or more stages of packet switches 214, 216, 218 as the transmission stops to be buffered and packets arbitration and resolution takes place in each one with a time-delay of D (Delta). In the diagram, the signal propagation delay is split into two parts of length L/2, but in practice there may be many components of the overall signal propagation delay. In the Optical Circuit Switch Network 280, signals propagate at the speed of light through the optical switch 284, so the end-to-end delay includes only the delay inside the source cluster 212, the destination cluster 220, and the signal propagation delay L since there are no electronic packet switches to buffer the signals. Delay through the optical circuit switch is less than the delay through the electronic packet switch.

Electronic Packet Switch (EPS) networks 150.

The EPS networks 150 include standard switches. These switches do not have a particularly high link bandwidth, and this is acceptable because trying to increase both the port count and the bandwidth per port of each switch becomes too complex and expensive. However, making a high radix (port count) electronic switch, with low bandwidth per port is feasible. Such a switch can also contain support for collective operations, for those applications with a critical performance dependence on collectives. In a preferred embodiment of the invention the EPS network 150 handles 10% of the OCS bandwidth. This is a reasonable ratio of EPS to OCS bandwidth, but other ratios are also possible as long as the ratio favors the OCS network 140 handling the majority of the traffic. The EPS network 150 is constructed to provide low-latency communication to partnering processors at low-bandwidth levels; therefore it is expected to be used sparingly.

The EPS network 150 is used to handle communication exceptions. Exceptions are low-bandwidth communications that do not merit the overhead and expense of setting up a circuit in the OCS. Since we want to optimize the OCS and its ability to handle the main high bandwidth data circuits, we use the EPS network 150 also for those cases of low-bandwidth communication among the processing nodes 104 in the system 100. This will help bound the set of communication partners to the number of links or circuits that can be accommodated by the OCS network 140.

In one embodiment, the EPS network 150 operates at roughly one-tenth or less the bandwidth of the OCS network 140 and connects all the clusters in the system, using electronic packet switches. The packet switches possibly include some processing ability built into the switches, performing collectives, where: 1) The optical switches using a circuit switching mode, establish persistent connections between pairs of clusters, such that the corresponding HPC applications' communication patterns can be mostly satisfied between source and destination processing nodes, by passing through the small intra-cluster network of the originating cluster, then passing through the circuit to the destination cluster, and finally passing the intra-cluster network of the destination cluster to arrive at the destination processing node 104 and, 2) a small portion of communication packets of the HPC applications, which do not fit in the already established circuits between clusters, will use a secondary all electronic packet network 150, such that only one-tenth or less of the overall bandwidth needs each processing node 104 generates and/or consumes, and 3) all collective operations, such as barrier sync, all reduce, gather, and the like, will be using the above all-electronic packet network 150.

Such setting of circuits between clusters will be persistent, and remain in use for some time before it can be reconfigured into connecting some or all of other pairs of clusters. The time it takes to reconfigure such circuit connections between clusters will be much smaller than the time the circuits are to be used by the HPC applications, before a change of phase in the computation done by such applications will require a change in the circuit connected clusters. If any two clusters are connected by the circuit, then any processing node 104 in those clusters can communicate with any other processing node 104 by passing through the intra-cluster network and the circuit connecting the clusters.

Communication Requirements.

Before setting up a system comprising a dual OCS and EPS network architecture such as the system 100 one must take into consideration the communication patterns exhibited by the applications to be run on the system 100. The most important pattern attributes to consider are:

1) The set of partners from each processor should be bounded. Ideally the communication degree should be small, where the communication degree here is taken to be the maximum size of the set of partners across all processors. Bounding the communication degree facilitates a limited number of circuits that need to be established within the OCS network 140.

2) Communicating partners with high-bandwidth requirements should utilize one of the high-bandwidth OCS networks 140. Conversely, communicating partners with low-bandwidth requirements should utilize a secondary low-bandwidth electronic network 150. The assignment of communications in this way will also aid in bounding the size of the communicating partner set on the OCS network 140 and hence the overall effectiveness of the OCS network 140.

3) The set of partners should ideally be slowly changing. Establishing an optical circuit can take several milliseconds when using MEMS technology due to the mechanical rotation of mirrors. This cost can be amortized over the time in which the communicating partner set persists, and thus is negligible if the partner set slowly changes—for example, on the order of seconds.

In the OCS architecture where an optical link must be established for each partner set, it matters how many communication partners a node has. One of the key points of the OCS architecture is that, if a node needs to communicate with k partners, then the node will need to have access to at least k planes of optical circuit switches to achieve good performance.

There are two possible definitions for the "degree of communication": 1) the number of unidirectional circuits (partners a node sends data to) or 2) the number of bidirectional circuits (partners a node exchanges data with). In the embodiment under discussion we use the later definition (i.e., every circuit is actually a bidirectional link), since (a) most applications require bidirectional data exchanges and (b) we need a return channel for flow control and acknowledgements of intact data transmission (although these could pass through the electronic network 150 in the case of a unidirectional setting). The system 100 handles each direction independently. A circuit set up from one cluster to another will be unidirectional; therefore it may take two set-ups, one on each side and perhaps on different switching planes.

Figure 3:
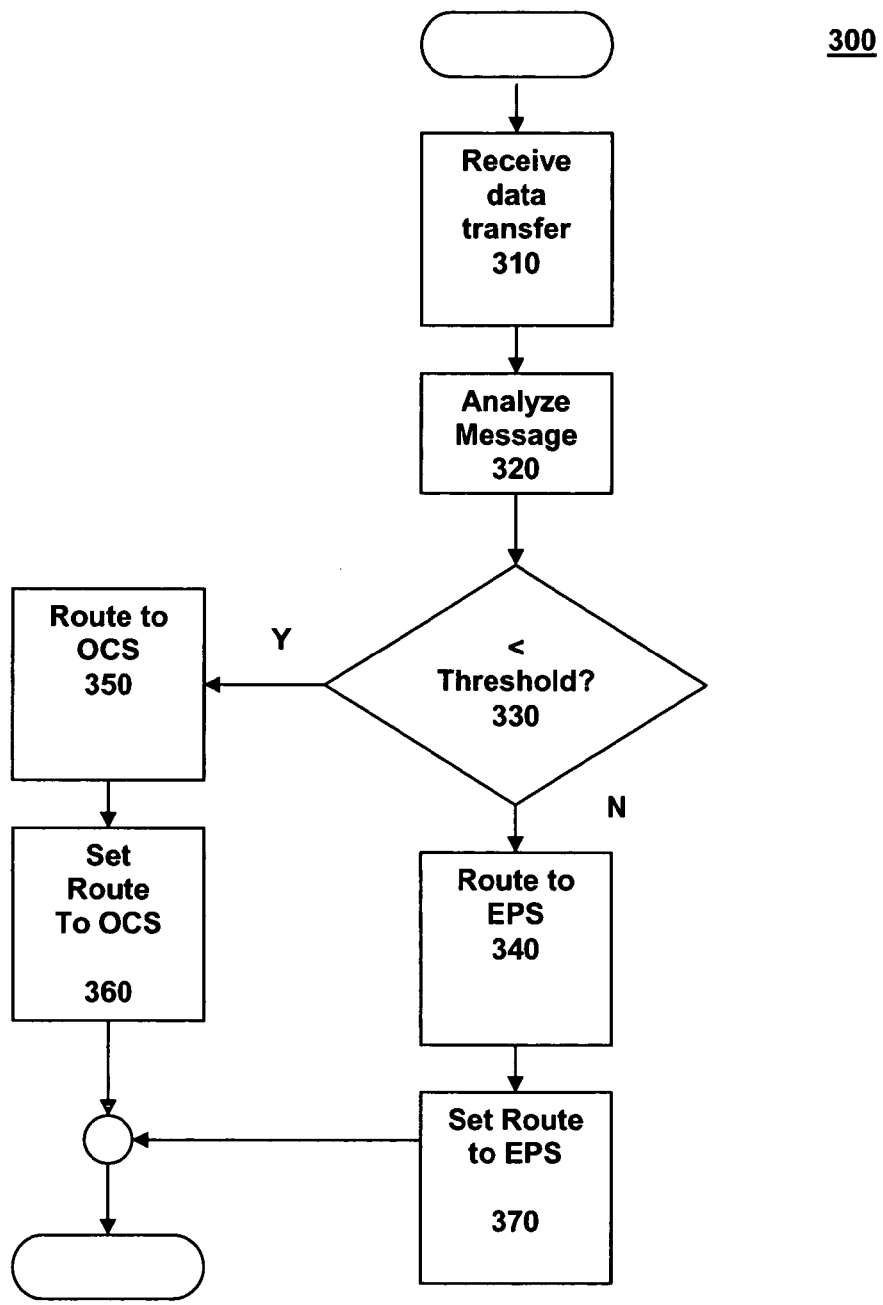
FIG. 3 is a flow chart illustrating a method according to the invention.

Referring now to FIG. 3 we discuss a step-by-step process 300 used to achieve the dual network-type system 100 according to an embodiment of the invention. In step 310 a Network Interface Chip (NIC) receives a data transfer, or message, from an attached node. It then has to determine whether to send the message through the EPS or OCS network. At the beginning of an iteration all messages from a source node, s, are routed through the EPS network 150. By monitoring the traffic between s and d, the system 100 can determine if the establishment of a dedicated circuit in the OCS network 140 is justified; i.e., exceeds the pre-determined threshold. The communication requirements of an application are analyzed in step 320. The analysis may include collecting dynamic call-graph information and message passing activity when executing the application.

In step 330 the data transfer is measured against a pre-determined, user-selected (or system-selected) threshold. The threshold may be based on static information about the message sizes, frequency of communication, or destination. If the measurement falls below the pre-determined threshold amount, the communication or data transfer is routed to an EPS network 150 in step 340. Although some static and persistent communications may be routed through the OCS network 140, some static and persistent communications will not use the OCS if their transferred data amount is not large enough or if they do not occur often enough to exceed a beneficial threshold as determined by the technology.

If the communication is not selected to be routed to an EPS network 150, the NIC generates a request to the OCS to establish a communication link between a source s and a destination d and the communication is routed to an OCS network 140 in step 350. After the circuit in the OCS is established and the NIC is notified, in step 360 all subsequent traffic from s to d will be routed through the established circuit in the OCS., Otherwise, if an EPS connection between s and d has been established in step 340, all subsequent traffic from s to d is routed to the EPS circuit in step 370. The process steps of FIG. 3 are only one embodiment; other steps may be used to achieve the dual network-type system 100.

Figure 4:
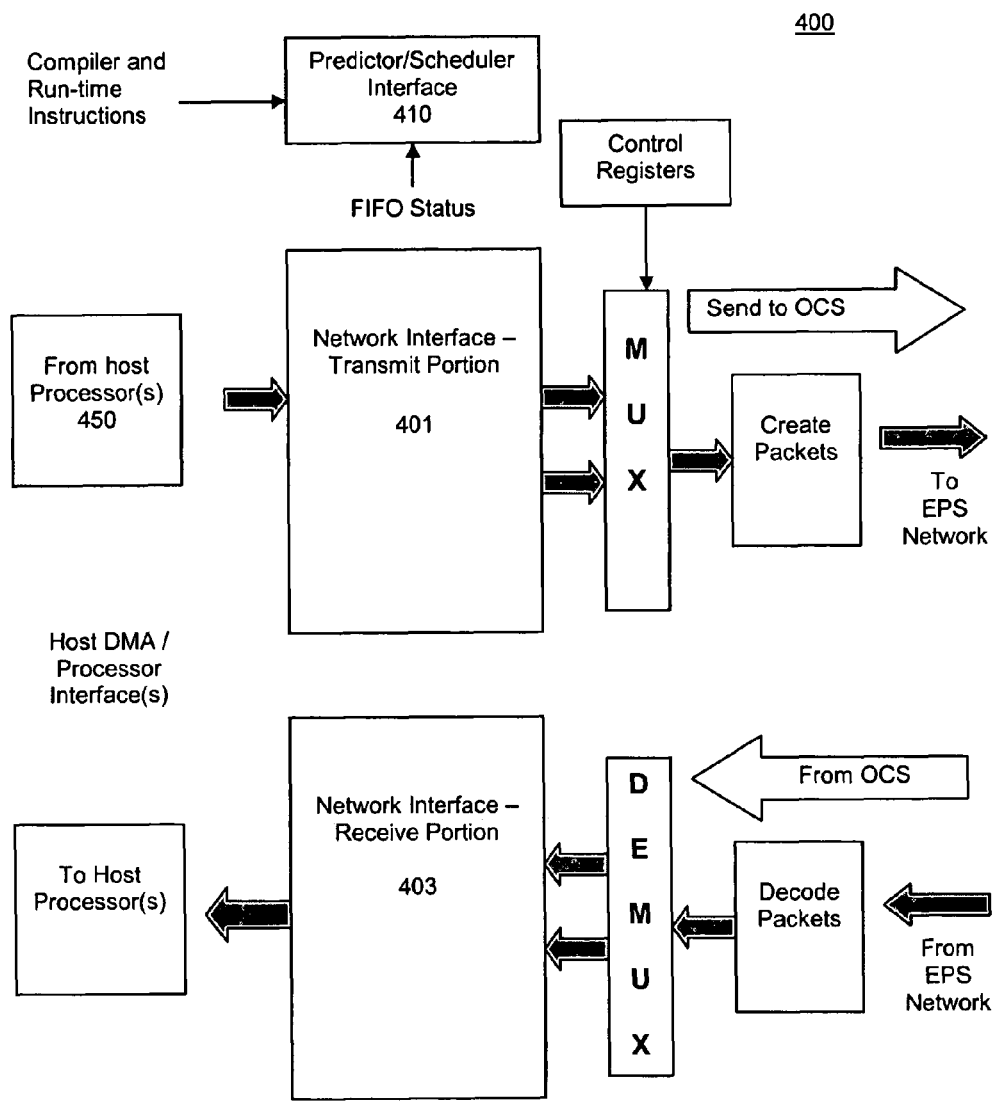
FIG. 4 is an illustration of a Network Interface Card with integrated prediction hardware for the dual OCS and EPS network, according to an embodiment of the invention.

FIG. 4 shows a network interface card (NIC) or host channel adapter (HCA) design 400 that can implement the algorithm described in FIG. 3. The Network Interface—Transmit Portion 401 accepts data from the host processor(s) 450 and transmits them over either the OCS network 140 or the EPS network 150, depending on information processed by the Predictor/Scheduler interface 410. The Network Interface—Receiver Portion 403 receives data from both the OCS and the EPS, multiplexes them, and sends them to the host processor(s) 450.

To better predict communication patterns, we may require a new communication pattern representation scheme wherein a communication matrix is considered at each communication call-point in an application. A communication call-point includes the previous call-stack to that communication point. Using a call-stack for each communication call-point is important because many applications employ the use of a communication layer. The communication layer is used to call a message passing library such as MPI. A communication matrix can be constructed for sub-sets of an application's entire execution. This is beneficial because separate matrices can then be constructed for each data transfer iteration if the application's communication requirements change dynamically.

As described earlier, a reason for having two network types is to use the circuit switched OCS networks 140 to establish connections between pairs of nodes that communicate heavily, while routing traffic between lightly communicating nodes through the EPS networks 150. We assume that there is no known communication pattern existing between any two specific nodes s and d, and will rely on a run-time system to determine which connections between s and d to establish in the OCS network 140. However, it is possible to also use prior knowledge to set up the OCS circuits as well as decide which packets will go through which type of network. This prior knowledge could be detected automatically, at compile time, or even specified by the user of the system as hints for the communication topology the application running-will represent communication-wise, for most of its communication needs.

There are hardware and software traffic monitoring techniques available which can be used to determine connections between nodes. In addition to, or in place of, these known techniques, application-specific migration policies can be devised to determine when a dedicated connection between two nodes is justified. The OCS cannot accommodate all possible connections simultaneously. In a situation where the OCS is fully populated and a migration policy decides to add a new connection, some provision has to be taken to flush an existing OCS connection. A replacement policy is then needed to determine which existing connection(s) to tear down (flush) in order to make room for the new connection determined by the migration policy.

A given logical topology may be realized and used to route messages. Additionally, the logical topology can establish long-lived connections in the OCS. As an example, a logical ring may be embedded in an OCS by establishing a connection between every two adjacent nodes n and n+1.

It may be possible to predict the connections that will exhibit heavy traffic at run-time, and to insert code in the executable that will be sent to the NIC, to establish these connections in the OCS network 140. Note that it is possible to combine compiled communication with run-time circuit setup migrations in the OCS system 140. The run-time monitoring system will be left to make decisions concerning the connections that could not be determined statically.

Once a communication pattern is determined, the compiler inserts communication instructions into the application for the configuration of the OCS. In one embodiment, two types of network configuration instructions are designed: 1) setup instructions; and 2) flush instructions. Setup instructions are used to pre-establish network connections in order to reduce the setup overhead of the OCS. Flush instructions are used to flush the current network configuration, effectively de-allocating ("flushing") the circuits that are no longer used. This reduces the number of network conflicts that would otherwise come about without the compiler's communication instructions.

If the compiler can predict the communication pattern, in the Predictor/Scheduler Interface 410, then this static information can be used in place of prediction. However, the compiler may determine that some of the communications are dynamic and cannot be determined statically. The information gleaned from a predicted communication pattern can be used in subsequent executions of the same program. The predicted pattern could also be used as a profiler during an initial execution to assist in a second execution of the same code. This is due to the fact that the information required to perform predictions is the same information that is required to perform profiling. In prediction the destination, frequency and average length of messages, for example, can be used to estimate the benefit of setting up a circuit in the OCS network 140. In profiling, this information is collected but is statistically analyzed. This information is extremely valuable to the Predictor 410.

Typical HPC applications, requiring more than one destination per node, have stable, low degree communication patterns, which could be mapped onto the network architecture of the system 100. Also, the system 100 allows the system to be partitioned such that different applications/workloads running on different parts of the system 100 will be completely isolated from any traffic effects of the other parts of the system.

By using inexpensive telco optical switches in the system 100 we can scale the size of an HPC system to have tens of thousands of processing nodes 104, and have them partitioned as needed to run different jobs/workloads on them, and also easily bring in (or take-out) nodes for dynamic load balancing since we can reconnect/reconfigure the circuit switching parts to connect more nodes or less as needed by the application.

Using multiple circuit switching planes is natural to current structures that call for multiple links from each node, as in HPC systems. Therefore multiple links work well with this OCS model of having multiple circuit switching planes, where each processor node 104 has a number of circuits it can set using these links, and also a few such processing nodes 104 (e.g. on a blade) can share their links among themselves, thus maximizing the mapping/embedding of HPC workloads onto the OCS structure.

Natural scalability of the bandwidth available through an optical link is achieved by using circuit switching and appropriate optical link technology such as Dense Wavelength Division Multiplexing. The scalability comes from being able to hook the optical link directly from within the processing node 104 socket, without passing through an out of socket hub/NIC/HCA chip. As the bandwidth of links increases, it represents a natural path to scale up the overall bandwidth available in the system 100. Since the circuit switching part uses all optical switches the upgradeability path of such a network only requires change at the link/Processor level and not at the switch level. The optical switches are oblivious to the protocol, signaling speed, and number of wavelength being switches.

All-electronic network switches, however, are sensitive to changes in link protocol or signaling speed and require a totally new network/switch when bandwidth scales up. Additionally, electronic switches are not as flexible in the protocol they support, although in principle a general purpose switch, processing all type of protocols, could be made at the expense perhaps of speed. Such a switch will work with different, multi-protocol packets. The use of a multi circuit packet switching OCS network allows for a software-based protocol processing, which could be done inside the processing node 104, by a dedicated core (out of a few on the chip) or by a dedicated thread (in a multi-threading, multi-CPU core), or by special hardware assisted off-loading. Because we can connect such circuit switching links from inside the Proc socket, with a simple memory mapped I/O interface, we have access to the internal structure (cache, memory controller, etc.) without having to go over the I/O pins and through an intermediate bus/link protocol connecting to an external hub/NIC/HCA. This eliminates the need for a hub/NIC/HCA (and lowers the cost) because the OCS circuit switch only deals with a limited number of partners.

Since we have a limited number of partners a circuit/processor is linked with through the OCS model, we can think of other software paradigms, such as multiple overlapping address spaces in a distributed shared memory model, that is only limited to a number of nodes, rather than shared by every node in the system, hence making it efficient to manage.

Therefore, while there have been described what are presently considered to be the preferred embodiments, it will be understood by those skilled in the art that other modifications can be made within the spirit of the invention.

The invention claimed is:

1. A system comprising:
a plurality of tightly coupled processing nodes, each processing node being part of a cluster and connected to an intra-cluster network which passes communication packets between all processing nodes of each cluster, each processing node comprising one or more inter-cluster opto-electronic links and one or more intra-cluster electronic links;
a plurality of circuit switched networks using a circuit switching mode, interconnecting the tightly coupled processing nodes through the one or more intra-cluster electronic links, and handling data transfers that meet at least one criteria; and
a plurality of electronic packet switched networks, also interconnecting the processing nodes through the one or more inter-cluster opto-electronic links, handling data transfers that do not meet the at least one criteria;
wherein the plurality of circuit switched networks and the plurality of electronic packet switched networks operate simultaneously and the plurality of electronic packet switched networks have a bandwidth per link that is ten percent the bandwidth per link of the plurality of circuit switched networks.

2. The system of claim 1 wherein the at least one criteria is a minimum length of a data transfer.

3. The system of claim 1 wherein the at least one criteria is a destination of a data transfer.

4. The system of claim 1 wherein the plurality of electronic packet switched networks handle collectives and short-lived data transfers among the processing nodes.

5. The system of claim 1 wherein one criteria is based upon usage of the plurality of circuit switched networks and the plurality of electronic packet switched networks, and in response to the usage being below a threshold, the data transfer is sent to the plurality of electronic packet switched networks for routing.

6. The system of claim 1 wherein when a circuit exists between two clusters, the circuit is shared and used for other requests to route data to the processing nodes in the two clusters, by passing through the clusters' packet switching network of source s and destination d, a data transfer is routed through the circuit switched network and all subsequent data transfers between source s and destination d are routed to the circuit switched network.

7. The system of claim 2 wherein each cluster comprises multiple inter-cluster connections.

8. The system of claim 1 further comprising a plurality of clusters comprising the processing nodes, and a plurality of intra-cluster communication links.

9. The system of claim 8 wherein the inter-cluster opto-electronic links comprise two types: point-to-point connections and packet-switched connections.

10. The system of claim 8 wherein the intra-cluster communication links are electronic packet-switching switches.

11. The system of claim 1 further comprising dynamic processing of separate matrices for each iteration of data transfer.

12. The system of claim 1 wherein one or more barrier sync operations use one or more of the plurality of electronic packet switched networks.

13. The system of claim 1 wherein the plurality of inter-cluster opto-electronic links is connected with protocol processing hubs such that each processing node can share the opto-electronic links with any other processing node in the same cluster.

14. The system of claim 1 wherein the one or more optical switches connects all the inter-cluster opto-electronic links of all the clusters.

15. The system of claim 1 further comprising a mapping of communicating partners between the plurality of circuit switched networks and the plurality of electronic packet switched networks.

16. The system of claim 1 wherein each processing node seeking communication with k partners has access to at least k planes of circuit switches.

17. A method comprising steps of:
receiving a data transfer at at least one node in a network comprising a plurality of processing nodes, each processing node being part of a cluster and connected to an intra-cluster network which passes communication packets between all processing nodes of each cluster, each processing node comprising one or more inter-cluster opto-electronic links and one or more intra-cluster electronic links;
sending the data transfer to one or more circuit switched networks via the inter-cluster opto-electronic links when the data transfer meets at least one criteria; and
sending the data transfer to one or more packet switched networks via the intra-cluster electronic links when the data transfer does not meet the at least one criteria, wherein the packet switched network has a bandwidth per link that is ten percent of the bandwidth per link of the circuit switched network.

18. The method of claim 17 wherein the at least one criteria is based upon usage of the circuit switched network and the electronic packet switched network.

19. The method of claim 17 wherein the at least one criteria is a minimum length of the data transfer.

20. The method of claim 17 wherein sending the data transfer is a decision made dynamically at run-time.

* * * * *